(12) United States Patent
Raghavan et al.

(10) Patent No.: US 11,990,960 B2
(45) Date of Patent: May 21, 2024

(54) BEAMFORMING CONFIGURATIONS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US); Mohammad Ali Tassoudji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 17/448,629

(22) Filed: Sep. 23, 2021

(65) Prior Publication Data

US 2023/0088577 A1 Mar. 23, 2023

(51) Int. Cl.
*H04W 72/21* (2023.01)
*H04B 7/06* (2006.01)
*H04B 7/0417* (2017.01)

(52) U.S. Cl.
CPC ......... *H04B 7/0617* (2013.01); *H04B 7/0634* (2013.01); *H04W 72/21* (2023.01); *H04B 7/0417* (2013.01)

(58) Field of Classification Search
CPC .. H04B 7/0617; H04B 7/0634; H04B 7/0417; H04B 7/0628; H04B 7/0695; H04B 7/088; H04B 7/063; H04W 72/0413; H04W 72/21; H04W 72/046
USPC .......................................................... 375/267
See application file for complete search history.

(56) References Cited

U.S. PATENT DOCUMENTS

| | | | | |
|---|---|---|---|---|
| 6,970,142 | B1* | 11/2005 | Pleva ................... | H01Q 1/3283 |
| | | | | 343/876 |
| 2017/0331544 | A1* | 11/2017 | Athley ................ | H04B 7/0417 |
| 2019/0109625 | A1* | 4/2019 | Subramanian ...... | H04W 72/046 |
| 2019/0281588 | A1* | 9/2019 | Zhang ................. | H04B 7/0617 |
| 2019/0313391 | A1* | 10/2019 | Lin ....................... | H04W 72/23 |
| 2019/0335430 | A1* | 10/2019 | Ljung .................. | H04B 7/088 |
| 2020/0213054 | A1* | 7/2020 | Park ..................... | H04B 7/0639 |
| 2023/0043847 | A1* | 2/2023 | Haustein ............ | H04B 7/06966 |

* cited by examiner

*Primary Examiner* — Syed Haider
(74) *Attorney, Agent, or Firm* — Harrity & Harrity, LLP

(57) ABSTRACT

Various aspects of the present disclosure generally relate to wireless communication. In some aspects, a user equipment (UE) may transmit an indication of a capability to use a set of beamforming configurations associated with a beamforming circuit architecture of the UE. The UE may receive an indication of a selected beamforming configuration to use for one or more communications. Numerous other aspects are described.

28 Claims, 11 Drawing Sheets

BEAMFORMING CONFIGURATIONS

FIELD OF THE DISCLOSURE

Aspects of the present disclosure generally relate to wireless communication and to techniques and apparatuses for beamforming configurations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting an indication of a capability to use a set of beamforming configurations associated with a beamforming circuit architecture of the UE. The method may include receiving an indication of a selected beamforming configuration to use for one or more communications.

Some aspects described herein relate to a method of wireless communication performed by a base station. The method may include receiving, from a UE an indication of a capability to use a set of beamforming configurations associated with a beamforming circuit architecture of the UE. The method may include transmitting an indication of a selected beamforming configuration to use for one or more communications.

Some aspects described herein relate to a UE for wireless communication. The user equipment may include a memory and one or more processors coupled to the memory. The one or more processors may be configured to transmit an indication of a capability to use a set of beamforming configurations associated with a beamforming circuit architecture of the UE. The one or more processors may be configured to receive an indication of a selected beamforming configuration to use for one or more communications.

Some aspects described herein relate to a base station for wireless communication. The base station may include a memory and one or more processors coupled to the memory. The one or more processors may be configured to receive, from a UE an indication of a capability to use a set of beamforming configurations associated with a beamforming circuit architecture of the UE. The one or more processors may be configured to transmit an indication of a selected beamforming configuration to use for one or more communications.

Some aspects described herein relate to a non-transitory computer-readable medium that stores a set of instructions for wireless communication by a UE. The set of instructions, when executed by one or more processors of the UE, may cause the UE to transmit an indication of a capability to use a set of beamforming configurations associated with a beamforming circuit architecture of the UE. The set of instructions, when executed by one or more processors of the UE, may cause the UE to receive an indication of a selected beamforming configuration to use for one or more communications.

Some aspects described herein relate to a non-transitory computer-readable medium that stores a set of instructions for wireless communication by a base station. The set of instructions, when executed by one or more processors of the base station, may cause the base station to receive, from a UE an indication of a capability to use a set of beamforming configurations associated with a beamforming circuit architecture of the UE. The set of instructions, when executed by one or more processors of the base station, may cause the base station to transmit an indication of a selected beamforming configuration to use for one or more communications.

Some aspects described herein relate to an apparatus for wireless communication. The apparatus may include means for transmitting an indication of a capability to use a set of beamforming configurations associated with a beamforming circuit architecture of the UE. The apparatus may include means for receiving an indication of a selected beamforming configuration to use for one or more communications.

Some aspects described herein relate to an apparatus for wireless communication. The apparatus may include means for receiving, from a UE an indication of a capability to use a set of beamforming configurations associated with a beamforming circuit architecture of the UE. The apparatus may include means for transmitting an indication of a selected beamforming configuration to use for one or more communications.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
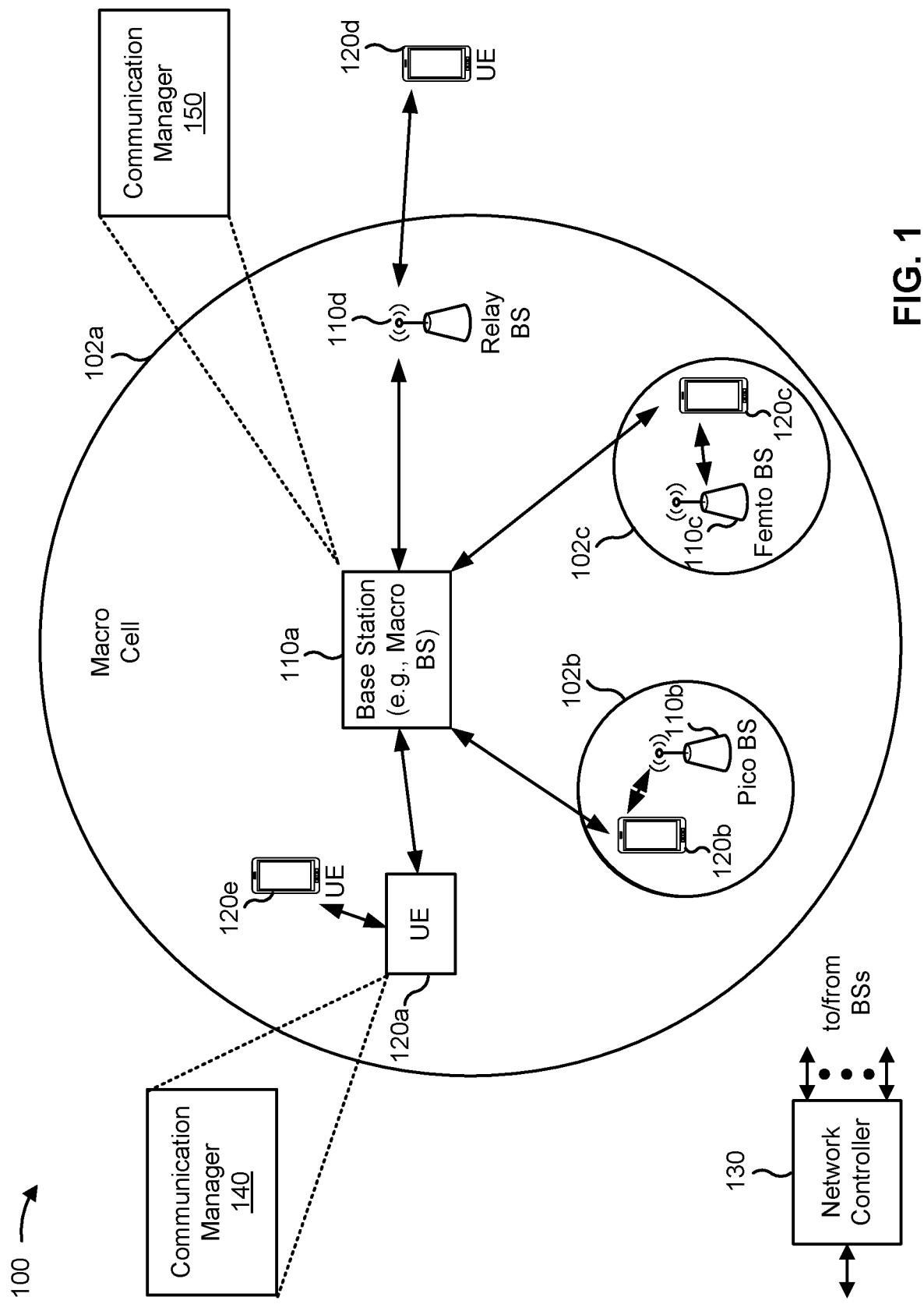
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit an indication of a capability to use a set of beamforming configurations associated with a beamforming circuit architecture of the UE; and receive an indication of a selected beamforming configuration to use for one or more communications. Additionally, or alternatively, the communication manager 140 may perform one or more other operations described herein.

In some aspects, the base station 110 may include a communication manager 150. As described in more detail elsewhere herein, the communication manager 150 may receive, from a UE an indication of a capability to use a set of beamforming configurations associated with a beamforming circuit architecture of the UE; and transmit an indication of a selected beamforming configuration to use for one or more communications. Additionally, or alternatively, the communication manager 150 may perform one or more other operations described herein.

As indicated above, FIG. 1 is provided as an example. Other examples may differ from what is described with regard to FIG. 1.

Figure 2:
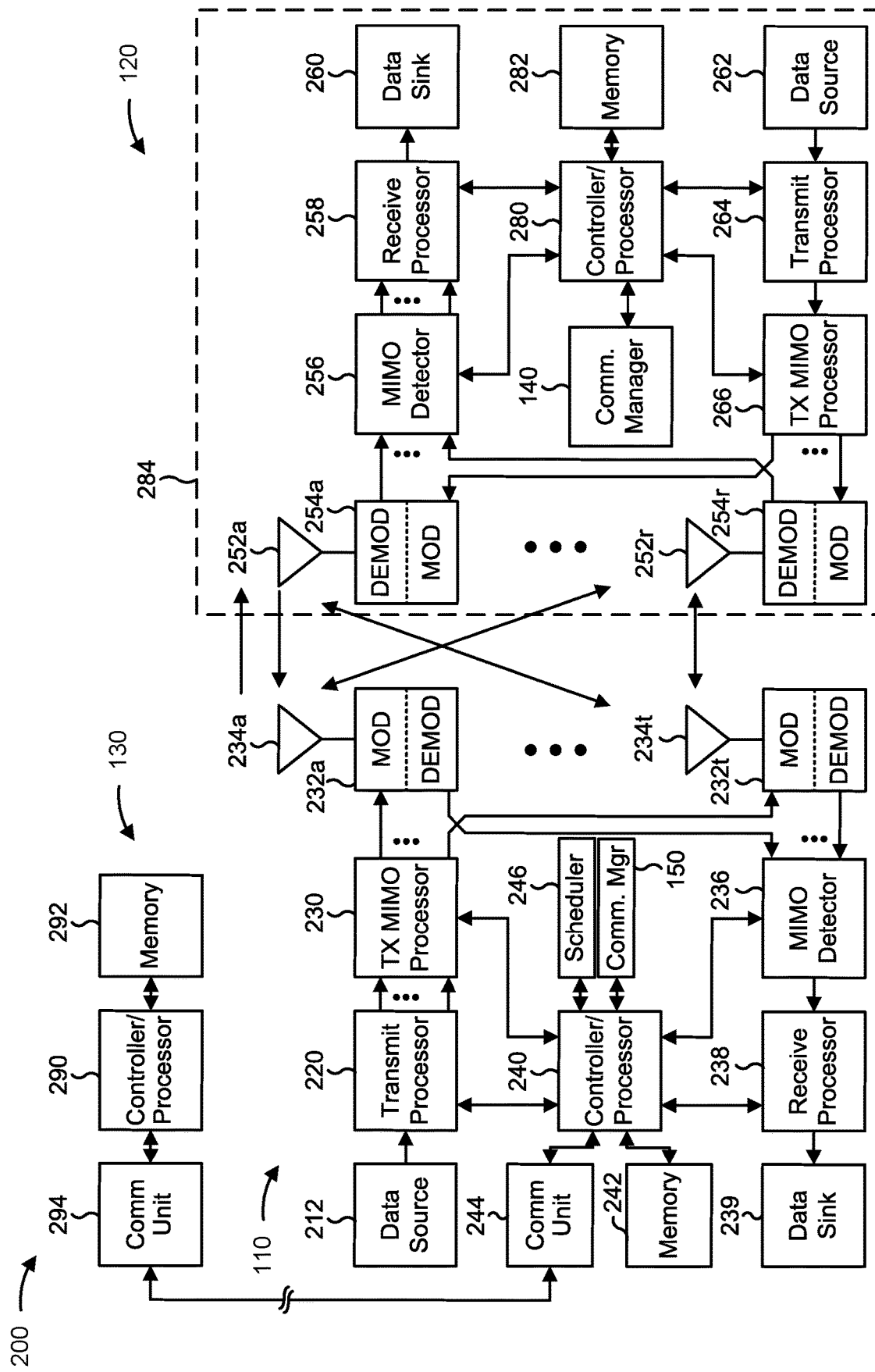
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the base station 110, the controller/processor 280 of the UE 120, and/or any other component(s) of FIG. 2 may perform one or more techniques associated with communicating using UE-supported beamforming configurations, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE includes means for transmitting an indication of a capability to use a set of beamforming configurations associated with a beamforming circuit architecture of the UE; and/or means for receiving an indication of a selected beamforming configuration to use for one or more communications. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for receiving, from a UE an indication of a capability to use a set of beamforming configurations associated with a beamforming circuit architecture of the UE; and/or means for transmitting an indication of a selected beamforming configuration to use for one or more communications. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
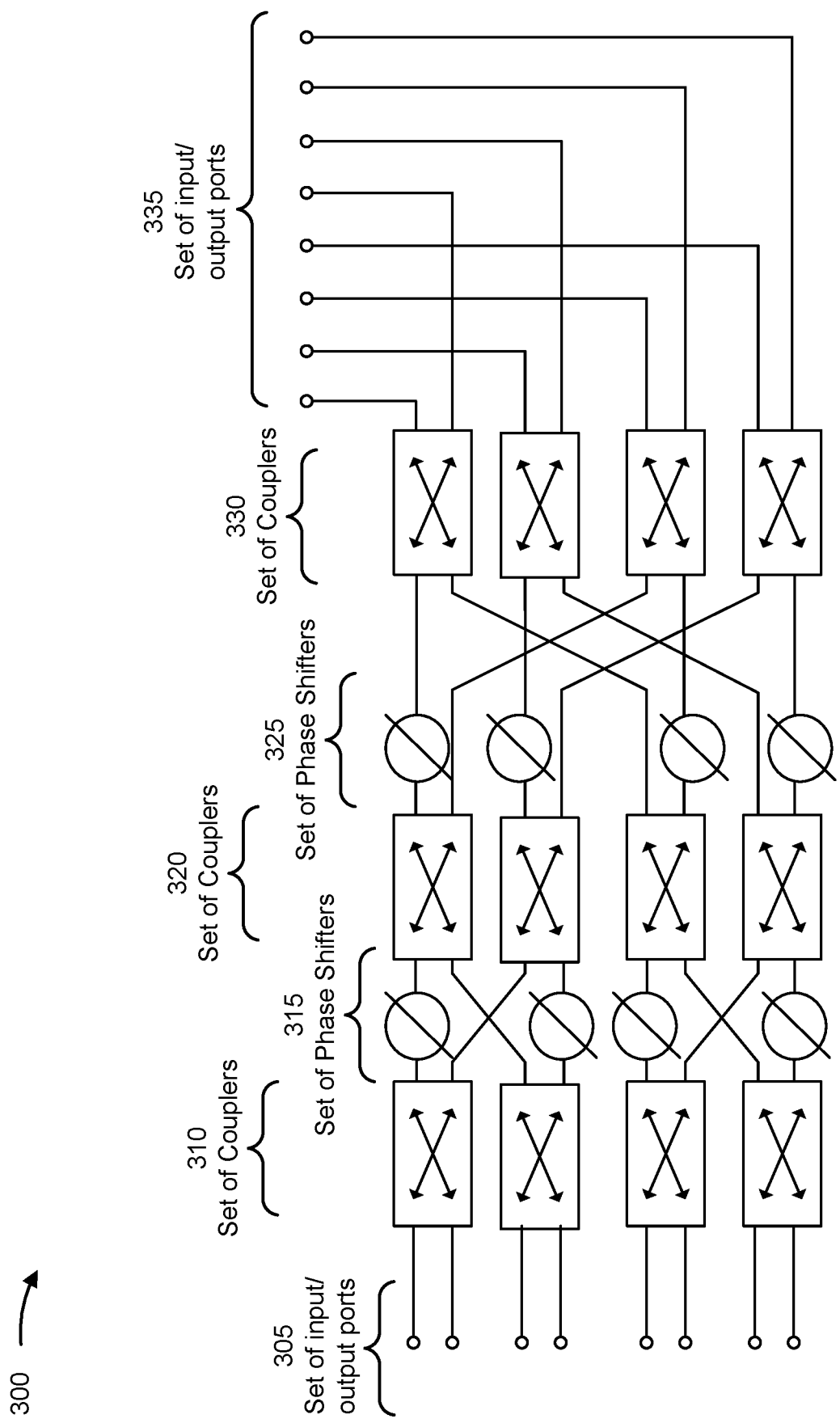
FIG. 3 is a diagram illustrating an example of a Butler matrix, in accordance with the present disclosure.

FIG. 3 is a diagram illustrating an example of a Butler matrix 300, in accordance with the present disclosure. A Butler matrix architecture may conserve space on a semiconductor chip as well as power during beamforming operations of a communication device (e.g., a UE or a base station). For example, a communication device may use a Butler matrix architecture to communicate via a set of beams (e.g., a static set of beams) over millimeter wave bands and/or sub-terahertz frequencies.

The Butler matrix 300 includes a set of input/output ports 305 that can receive signals on which the Butler matrix 300 operates and/or provide signals to another component (e.g., an antenna or a front end component, among other examples) after the Butler matrix 300 operates on the signals. In a three stage Butler matrix architecture with 8 input/output ports, these ports described in 305 are connected to a set of couplers 310, a set of phase shifters 315, a set of couplers 320, a set of phase shifters 325, a set of couplers 330, and/or a set of input/output ports 335. The sets of couplers 310, 320, 330 may provide connections that change an order of signals within the Butler matrix, such that an order (e.g., from top to bottom) at the set of input/output ports 305 is different from an order (e.g., from left to right) at the set of input/output ports 335. The sets of phase shifters 315, 325 may change phase shifts of signals within the Butler matrix, with each phase shifter having a fixed phase shift (e.g., being analog phase shifters). For example, the set of phase shifters 315 may include phase shifters that shift phases by −67.5 degrees and phase shifters that shift phases by −22.5 degrees. The set of phase shifters 325 may include phase shifters that shift phases by −45 degrees.

In this way, the Butler matrix 300 may use circuitry (e.g., static components) to form a static set of beams through which a communication device may communicate. The Butler matrix 300 has a first number of input ports (e.g., 2, 4, 8) where a signal is applied (e.g., received) and a second number of output ports (e.g., 2, 4, 8). The input ports may be coupled to antenna elements, or the output ports may be coupled to the antenna elements. The Butler matrix 300 may be configured to operate in both directions (e.g., a set of ports functions as input ports in a receive direction and as output ports in a transmit direction).

The Butler matrix may include $(N/2)*\log_2(N)$ hybrid couplers and $(N/2)*(\log_2(N)-1)$ fixed value phase shifters, where N is a number of input ports. As shown in FIG. 3, the Butler matrix may be configured with 8 input ports, such that N=8, the Butler matrix includes 12 hybrid couplers, and the Butler matrix includes 8 fixed value phase shifters.

The Butler matrix supports communication over a number of beams that may be equal to a number of input/output ports of the Butler matrix. The beams may be fixed, orthogonal, and simultaneously steerable. In this way, the Butler matrix may conserve power and semiconductor chip space when compared to beamforming hardware that includes a set of phase shifters that may be configured to apply variable phase shifts (e.g., as in a vector sum modulator architecture) and may be configurable to communicate using an increased number of beams. However, the base station and the UE may not be synchronized regarding a type of beamforming configuration that is supported by the UE. For example, if the UE supports a relatively small set of fixed beams for communicating with a base station, and the base station expects the UE to support a relatively large set of beams, the base station may communicate using a narrow beam, and the UE may fail to receive communications from the base station. This may cause the UE and/or the base station to consume power, communication, latency, computing, and/or network resources to detect and/or correct communication errors.

As indicated above, FIG. 3 is provided as an example. Other examples may differ from what is described with regard to FIG. 3.

In some aspects, a UE may be configured with one or more candidate beamforming configurations based at least in part on beamforming circuit architecture of the UE. For example, the UE may be configured with one or more Butler matrices, which may be tiled from individual Butler matrices. The UE may be configured to simultaneously use antenna elements from different tiles to facilitate improved beam steering and/or to increase a number of candidate beams that may be used (e.g., based at least in part on increased flexibility in applying different beam weights to the antenna elements from different tiles).

Additionally, or alternatively, the UE may be configured with a vector sum modulator architecture that allows adaptability in beamforming codebooks based at least in part on applying different beam weights. The different beam weights (e.g., amplitudes and/or phases) may be used to modify steering of a main lobe of a beam, a beamwidth of the main lobe, side lobe levels, and/or multi-beam communications, among other examples.

The UE may use a set of candidate beamforming configurations based at least in part on an array size of antenna elements, a carrier frequency, a demand for flexibility in beamforming capabilities, semiconductor chip area required, power parameters, and/or thermal parameters, among other examples. Based at least in part on a beamforming architecture that is available to the UE, the UE may indicate (e.g., to a base station) a capability to use a set of beamforming configurations associated with a beamforming circuit architecture of the UE. In this way, the UE and the base station may synchronize on a beamforming configuration to use for communications. This may cause the UE and/or the base station to conserve power, communication, computing, and/or network resources that may have otherwise been used to detect and/or correct communication errors.

In some aspects, the UE may indicate the capability, via a single bit, that progressive phase shifts (PPS) beams over a finite set of steering directions are supported (e.g., based at least in part on Butler matrix architecture) or that arbitrary beam weights are supported (e.g., using a vector sum modulator architecture). In some aspects, the UE may indicate the capability via a set of one or more bits that indicate a measurement of types of beam weights that may be generated using the beamforming architecture of the UE. In some aspects, the UE may indicate the capability via a single bit, or via multiple bits that may indicate different granularities (e.g., a number of PPS beams supported) in beamforming capabilities. In some aspects, the UE may indicate that arbitrary beam weights may be designed to enable a beamwidth and/or sidelobe levels based at least in part on channel conditions, or the UE may indicate that the UE may not adapt to channel conditions (e.g., based at least in part on using a Butler matrix architecture).

Figure 4:
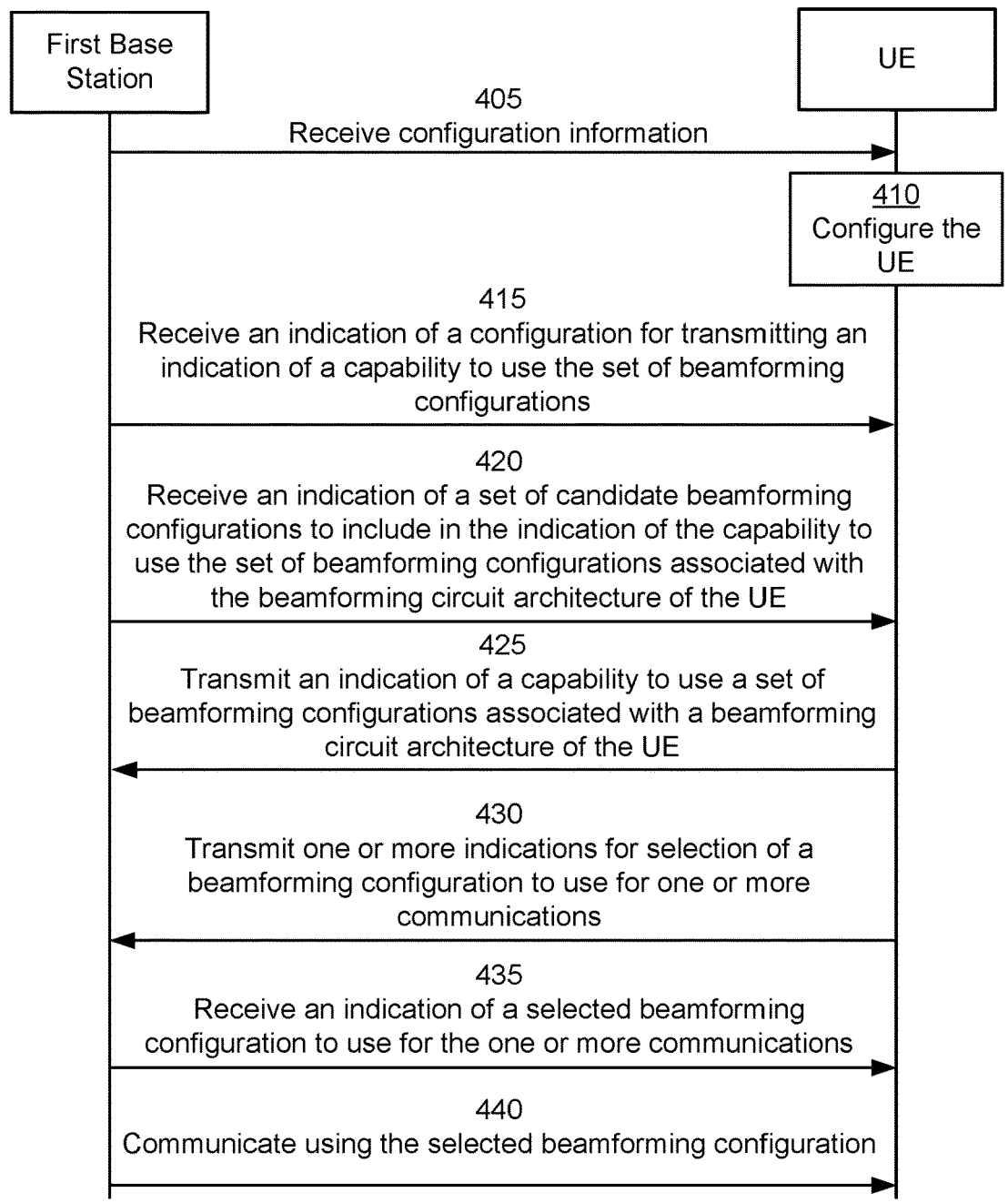
FIGS. 4-7 are diagrams illustrating examples associated with communicating using UE-supported beamforming configurations, in accordance with the present disclosure.

FIG. 4 is a diagram illustrating an example 400 associated with communicating using UE-supported beamforming configurations, in accordance with the present disclosure. As shown in FIG. 4, a base station (e.g., base station 110) may communicate with a UE (e.g., UE 120). In some aspects, the base station and the UE may be part of a wireless network (e.g., wireless network 100). The UE and the base station may have established a wireless connection prior to operations shown in FIG. 4.

As shown by reference number 405, the base station may transmit, and the UE may receive, configuration information. In some aspects, the UE may receive the configuration information via one or more of radio resource control (RRC) signaling, medium access control (MAC) control elements (MAC CEs), or downlink control information (DCI), among other examples. In some aspects, the configuration information may include an indication of one or more configuration parameters (e.g., already known to the UE) for selection by the UE, or explicit configuration information for the UE to use to configure the UE, among other examples.

In some aspects, the configuration information may indicate that the UE is to transmit an indication of a capability to use a set of beamforming configurations associated with a beamforming circuit architecture of the UE. In some aspects, the configuration information may indicate that the UE is to transmit the indication of the capability via RRC signaling (e.g., as a static or semi-static configuration) or via dynamic signaling (e.g., for dynamic switching of the UE configuration).

As shown by reference number 410, the UE may configure itself based at least in part on the configuration information. In some aspects, the UE may be configured to perform one or more operations described herein based at least in part on the configuration information.

As shown by reference number 415, the UE may receive, and the base station may transmit, an indication of a configuration for transmitting an indication of a capability to use the set of beamforming configurations. In some aspects, the base station may indicate that the UE is to transmit the indication of the capability via RRC signaling and/or via dynamic signaling (e.g., using uplink control information (UCI) and/or MAC CEs, among other examples). In some aspects, the base station may indicate that the UE is to transmit the indication via a single bit indication of whether the UE is configured for PPS beams or for arbitrary beam weights. In some aspects, the base station may indicate that the UE is to transmit the indication via multiple bits to indicate a number of supported beams (e.g., PPS beams), minimum angle between beam steering directions, granularity and/or flexibility of beam weights, whether an analog beamforming codebook of the UE supports arbitrary beam weights and/or a constrained set of beam weights, and/or whether the UE is capable of switching between beamforming configurations.

As shown by reference number 420, the UE may receive, and the base station may transmit, an indication of a set of candidate beamforming configurations to include in the indication of the capability to use the set of beamforming configurations associated with the beamforming circuit architecture of the UE. In some aspects, the base station may indicate a set of information that the UE is to include in the indication of the capability to use the set of beamforming configurations, such as a number of supported beams (e.g., PPS beams), minimum angle between beam steering directions, granularity and/or flexibility of beam weights, whether an analog beamforming codebook of the UE supports arbitrary beam weights and/or a constrained set of beam weights, and/or whether the UE is capable of switching between beamforming configurations As shown by reference number 425, the UE may transmit, and the base station may receive, an indication of a capability to use a set of beamforming configurations associated with a beamforming circuit architecture of the UE. In some aspects, the UE may transmit the indication via RRC signaling or via dynamic signaling. In some aspects, the UE may transmit the indication based at least in part on receiving a request for the information. In some aspects, the UE may transmit the indication based at least in part on the UE requesting to change a beamforming configuration (e.g., based at least in part on a change of power or thermal parameters at the UE).

In some aspects, the indication of the capability may include an indication of a capability to apply a set of beam weights to the set of antenna elements and/or an indication of a granularity of beam properties identifiable with the set of beam weights that the UE can apply to the set of antenna elements, among other examples. For example, the beam properties identifiable with the set of beam weights may include a range of beamwidths and associated array gains supported by the UE and/or a set of beamwidths and associated array gains supported by the UE, among other examples.

In some aspects, the set of beamforming configurations is based at least in part on a flexibility to beamform based at least in part on applying a set of beam weights to a set of antenna elements, a capability to combine a first antenna element of a first tile of antenna elements with a second antenna element of a second tile of antenna elements, a set of supported beam weights associated with the first antenna element and the second antenna elements, and/or a set of supported phase jumps between the first antenna element of a first tile of antenna elements and the second antenna element of the second tile of antenna elements, among other examples. In some aspects, the set of beamforming configurations is based at least in part on an acquisition of a communication link for the UE via a first subset of antenna elements at the UE and/or a mission-mode operation of the UE via a second subset of antenna elements at the UE. In some examples, the beamforming configurations included in the set of beamforming configurations is based at least in part on one or more parameters, as described herein.

In some aspects, the beamforming circuitry architecture of the UE includes one or more Butler matrices tiled together, one or more vector sum modulator architectures tiled together, and/or one or more lens array architectures tiled together. In some aspects, the beamforming circuitry architecture of the UE is based at least in part on antenna group sizes supported by the UE, carrier frequencies supported by the UE, flexibility in beamforming capabilities, space or aperture allocated for antenna elements of the UE, power resource constraints of the UE, and/or thermal constraints of the UE, among other examples.

As shown by reference number 430, the UE may transmit, and the base station may receive, one or more indications for selection of a beamforming configuration to use for one or more communications. For example, the UE may provide additional information (e.g., in addition to the capability as described in connection with reference number 425) for the base station to use to select a beamforming configuration communication with the UE. The additional information and/or the one or more indications may include indications of a flexibility to beamform based at least in part on applying a set of beam weights to a set of antenna elements, a capability to combine a first antenna element of a first tile of antenna elements with a second antenna element of a second tile of antenna elements, a set of supported beam weights associated with the first antenna element and the second antenna elements, and/or a set of supported phase jumps between the first antenna element of the first tile of antenna elements and the second antenna element of the second tile of antenna elements, among other examples.

In some aspects, the base station may select a beamforming configuration for the UE to use and/or a beamforming configuration for the base station to use based at least in part on the additional information and/or the one or more indications.

As shown by reference number 435, the UE may receive, and the base station may transmit, an indication of a selected beamforming configuration to use for the one or more communications. In some aspects, the indication of the selected beamforming configuration to use for the one or more communications may indicate a number of reference signals for the UE to receive, one or more types of reference signals for the UE to receive, a beam search scheme for the UE to use, and/or a beam refinement scheme for the UE to use.

As shown by reference number 440, the UE and the base station may communicate using the selected beamforming configuration of the UE. For example, the UE and the base station may perform a beam selection and/or beam refinement procedure using the selected beamforming configuration and/or may communicate the one or more communications using the selected beamforming configuration.

Based at least in part on the UE and the base station synchronizing on a beamforming configuration to use for communications, the UE and the base station may conserve power, communication, computing, and/or network resources that may have otherwise been used to detect and/or correct communication errors.

As indicated above, FIG. 4 is provided as an example. Other examples may differ from what is described with regard to FIG. 4.

Figure 5:
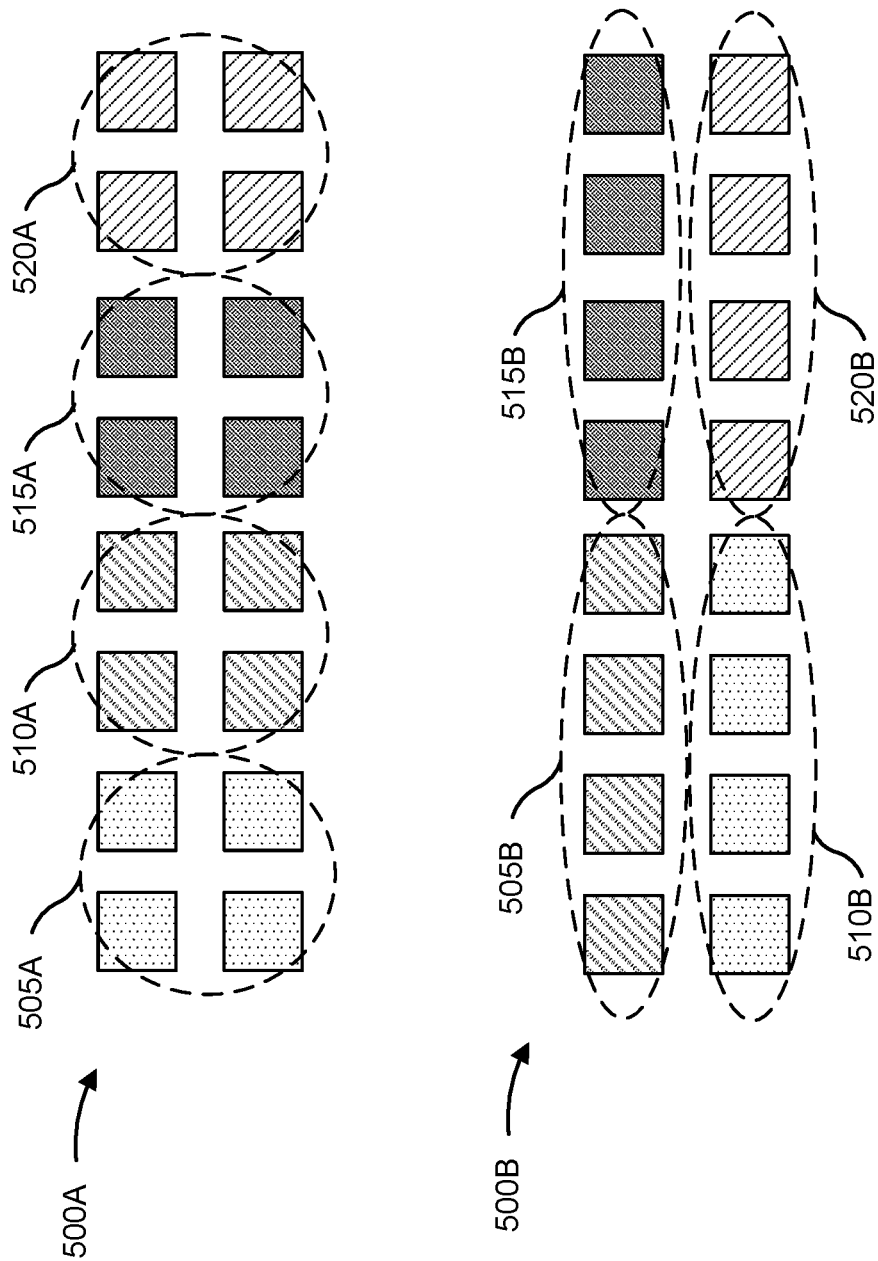

FIG. 5 is a diagram illustrating examples 500A and 500B associated with communicating using UE-supported beamforming configurations, in accordance with the present disclosure. As shown in FIG. 5, a UE (e.g., UE 120) may be configured with an antenna array that includes groups of antenna elements tiled together (e.g., as constituent sub-units). Antenna elements that are tiled together may share RF and intermediate frequency (IF) components, such as mixers. In this way, using the antenna elements that are tiled together has improved power and/or thermal optimization over using antenna elements that are in different tiles.

As shown in FIG. 5, a first example 500A includes a first tile 505A, a second tile 510A, a third tile 515A, and a fourth tile 520A. Each of the tiles 505A, 510A, 515A, 520A are 2×2 arrays. The entire array is of size 8×2 beamforming architecture that may be used with RF phase shifting and/or vector sum modulation that can use one or more of the tiles 505A, 510A, 515A, 520A. However, the UE may be configured to apply a same set of weights to all antenna elements within a respective tile.

As also shown in FIG. 5, a second example 500B includes a first tile 505B, a second tile 510B, a third tile 515B, and a fourth tile 520B. Each of the tiles 505B, 510B, 515B, 520B are 1×4 arrays. The entire array is again of size 8×2 beamforming architecture that may be used with RF phase shifting and/or vector sum modulation that can use one or more of the tiles 505B, 510B, 515B, 520B. However, the UE may be configured to apply a same set of weights to all antenna elements within a respective tile.

As indicated above, FIG. 5 is provided as an example. Other examples may differ from what is described with regard to FIG. 5.

Figure 6:
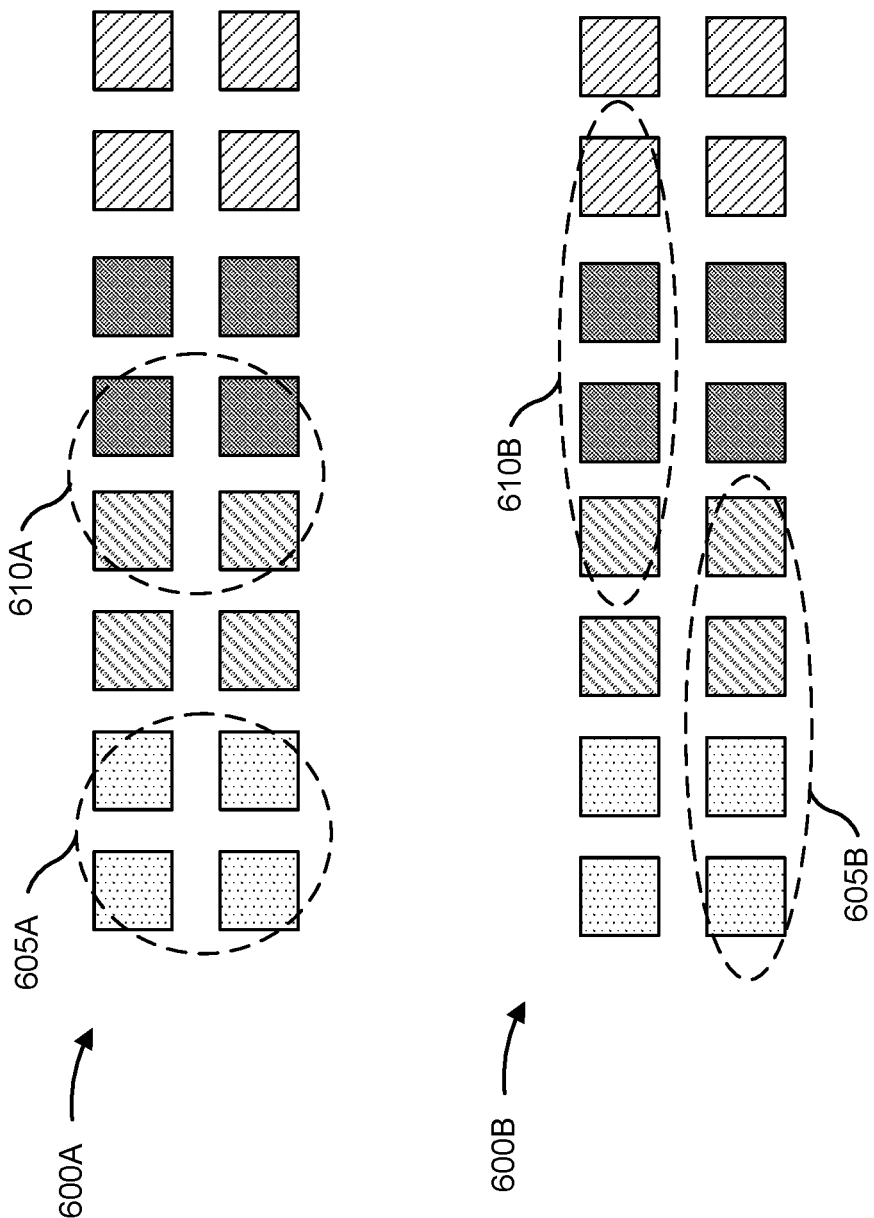

FIG. 6 is a diagram illustrating examples 600A and 600B associated with communicating using UE-supported beamforming configurations, in accordance with the present disclosure. As shown in FIG. 6, a UE (e.g., UE 120) may be configured with an antenna array that includes groups of antenna elements tiled together (e.g., as constituent sub-units).

As shown in example 600A, the UE has beamforming circuit architecture that includes 2×2 tiles of antenna elements. In some aspects, the UE may be configured to use a 2×2 array (e.g., a single tile) for initial acquisition. In this case the UE may select a set 605A of antenna elements that are included in a single tile for initial acquisition in an RF phase shifting and/or vector sum modulator architecture that allows a per-antenna amplitude and/or phase control (e.g., weighting). This may also reduce power consumption based at least in part on the antenna elements sharing common mixer and/or IF components (e.g., stages). In some aspects, the UE may be configured to use a set 610A of antenna elements that include antenna elements from different tiles. The set 610A of antenna elements may have improved flexibility in beamforming while increasing power consumption.

As shown in example 600B, the UE has beamforming circuit architecture that includes 2×2 tiles of antenna elements. In some aspects, the UE may be configured to use a 4×1 array (e.g., using antenna elements of two tiles) for initial acquisition. In this case the UE may select a set 605B of antenna elements that are included in two tiles for initial acquisition in an RF phase shifting and/or vector sum modulator architecture that allows a per-antenna amplitude and/or phase control (e.g., weighting). In some aspects, the UE may be configured to use a set 610B of antenna elements that include antenna elements from an increased number of tiles (e.g., 3 different tiles). The set 610B of antenna elements may have improved flexibility in beamforming while increasing power consumption.

As indicated above, FIG. 6 is provided as an example. Other examples may differ from what is described with regard to FIG. 6.

Figure 7:
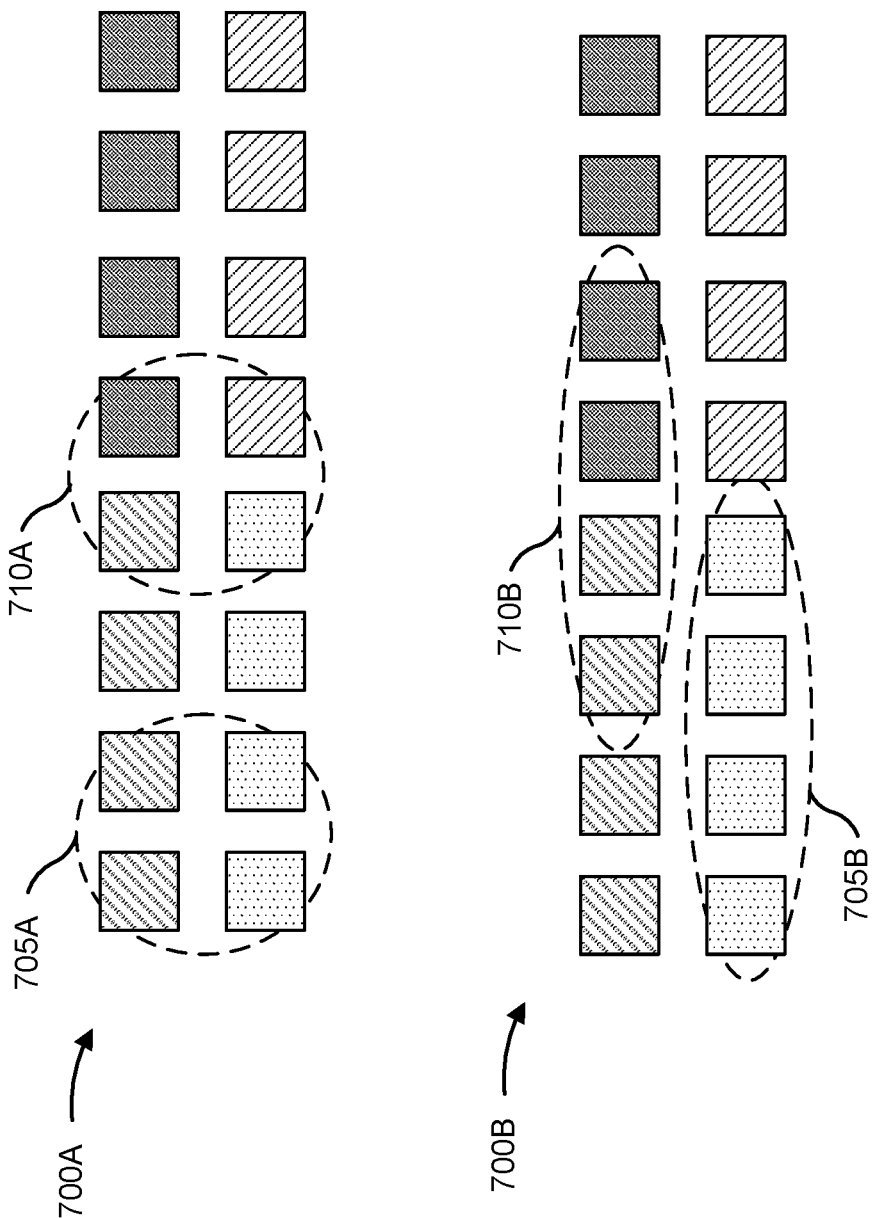

FIG. 7 is a diagram illustrating examples 700A and 700B associated with communicating using UE-supported beamforming configurations, in accordance with the present disclosure. As shown in FIG. 7, a UE (e.g., UE 120) may be configured with an antenna array that includes groups of antenna elements tiled together (e.g., as constituent sub-units).

As shown in example 700A, the UE has beamforming circuit architecture that includes 1×4 tiles of antenna elements. In some aspects, the UE may be configured to use a 2×2 array (e.g., a single tile) for initial acquisition. In this case the UE may select a set 705A of antenna elements that are included in two tiles, which may cause improved flexibility in beamforming while increasing power consumption based at least in part on exciting two tiles. In some aspects, the UE may be configured to use a set 710A of antenna elements that include antenna elements from four different tiles. The set 710A of antenna elements may have improved flexibility in beamforming while increasing power consumption based at least in part on using antenna elements from four different tiles. In this case each of the antenna elements use different mixers and/or IF components, which may require power to activate four RF integrated circuits (RFICs).

As shown in example 700B, the UE has beamforming circuit architecture that includes 4×1 tiles of antenna elements. In some aspects, the UE may be configured to use a 4×1 array (e.g., using antenna elements from two tiles) for initial acquisition. In this case the UE may select a set 705B of antenna elements that are included in a single tile. This may reduce power consumption based at least in part on the antenna elements sharing common mixer and/or IF components (e.g., stages) and may have decreased flexibility for steering beams. In some aspects, the UE may be configured to use a set 710B of antenna elements that include antenna elements from different tiles. The set 710B of antenna elements may have improved flexibility in beamforming while increasing power consumption based at least in part on using two different sets of mixers and/or IF components.

As indicated above, FIG. 7 is provided as an example. Other examples may differ from what is described with regard to FIG. 7.

In the examples shown in FIGS. 5-7, the UE may be configured to select a set of supported beamforming configurations based at least in part on the beamforming circuit architecture of the UE. Different beamforming configurations may have different benefits. For example, if 2×2 constituent sub-units are used to tile and produce an 8×2 array, both 2×2 and 4×1 arrays with arbitrary beam weights are possible with low and medium power in a vector sum modulator architecture. Additionally, or alternatively, some flexibility in beam weight design (but not arbitrary beam weights) may be possible with a Butler matrix architecture at the cost of power consumption.

In another example, if 4×1 constituent sub-units are used to tile and produce an 8×2 array, 2×2 and 4×1 arrays with arbitrary beam weights are possible with medium and low power in a vector sum modulator architecture. Additionally, or alternatively, arbitrary beam weights for a 2×2 array may be possible at the cost of power and some flexibility (but not arbitrary weights) is possible for a 4×1 array in a Butler matrix architecture.

Thus, depending on what constituent and/or sub-unit array size is used for tiling antenna elements, different types of beamforming requirements may be satisfied or may fail to be satisfied. Additionally, or alternatively, satisfaction of beamforming requirements may be based at least in part on power constraints. The base station may use information regarding beamforming configurations that are supported may be useful to understand a degree to which beam refinement is possible at the UE.

Figure 8:
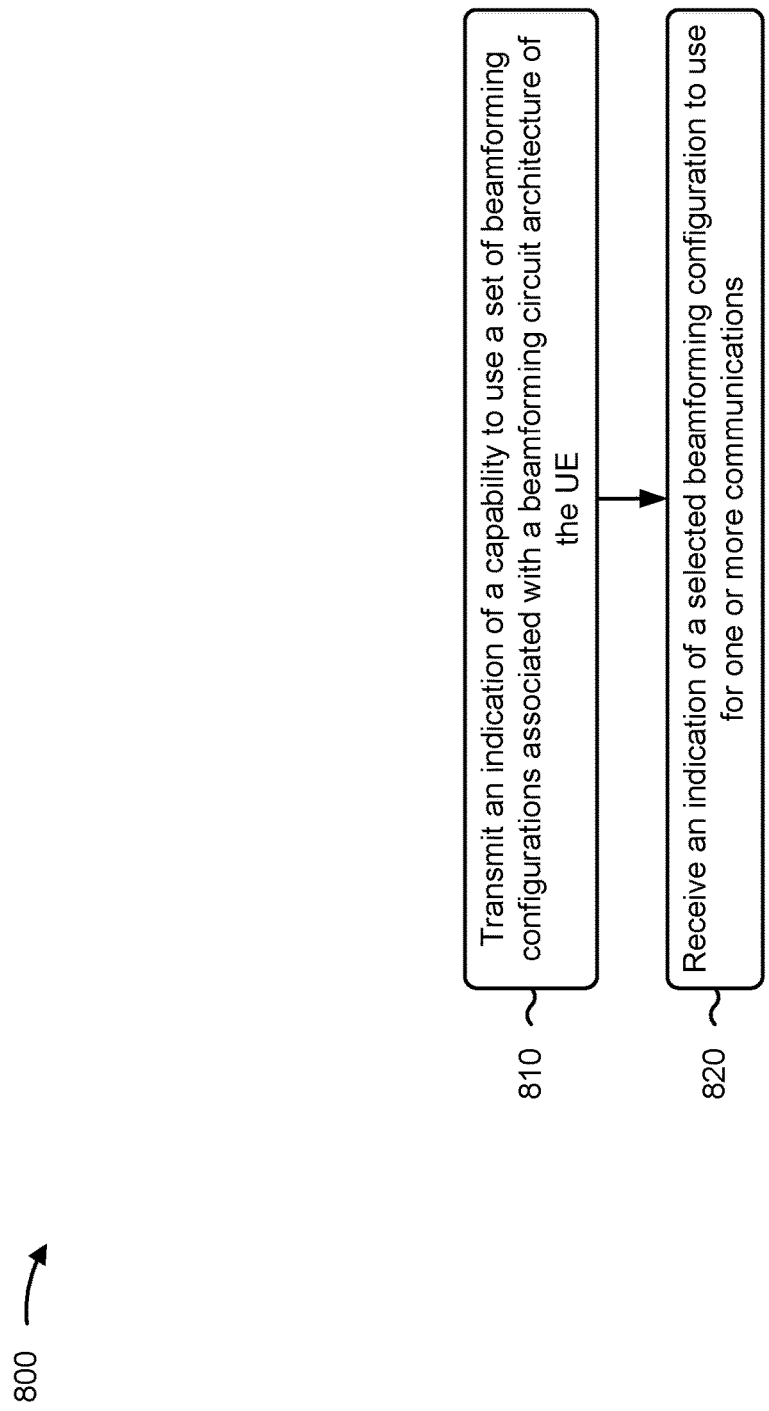
FIGS. 8 and 9 are diagrams illustrating example processes associated with communicating using UE-supported beamforming configurations, in accordance with the present disclosure.

FIG. 8 is a diagram illustrating an example process 800 performed, for example, by a UE, in accordance with the present disclosure. Example process 800 is an example where the UE (e.g., UE 120) performs operations associated with beamforming configurations.

As shown in FIG. 8, in some aspects, process 800 may include transmitting an indication of a capability to use a set of beamforming configurations associated with a beamforming circuit architecture of the UE (block 810). For example, the UE (e.g., using communication manager 140 and/or transmission component 1004, depicted in FIG. 10) may transmit an indication of a capability to use a set of beamforming configurations associated with a beamforming circuit architecture of the UE, as described above.

As further shown in FIG. 8, in some aspects, process 800 may include receiving an indication of a selected beamforming configuration to use for one or more communications (block 820). For example, the UE (e.g., using communication manager 140 and/or reception component 1002, depicted in FIG. 10) may receive an indication of a selected beamforming configuration to use for one or more communications, as described above.

Process 800 may include additional aspects, such as any single aspect or any combination of aspects described below and/or in connection with one or more other processes described elsewhere herein.

In a first aspect, the indication of the capability to use the set of beamforming configurations comprises one or more of an indication of a capability to apply a set of beam weights to a set of antenna elements, or an indication of a granularity of beam properties identifiable with the set of beam weights that the UE can apply to the set of antenna elements.

In a second aspect, alone or in combination with the first aspect, the beam properties identifiable with the set of beam weights comprise one or more of a range of beamwidths and associated array gains supported by the UE, or a set of beamwidths and associated array gains supported by the UE.

In a third aspect, alone or in combination with one or more of the first and second aspects, the beamforming circuit architecture of the UE comprises one or more of one or more Butler matrices together, one or more vector sum modulator architectures tiled together, or one or more lens array architectures tiled together.

In a fourth aspect, alone or in combination with one or more of the first through third aspects, the beamforming circuit architecture of the UE is associated with one or more of antenna group sizes supported by the UE, carrier frequencies supported by the UE, flexibility in beamforming capabilities, space or aperture allocated for antenna elements of the UE, power resource constraints of the UE, or thermal constraints of the UE.

In a fifth aspect, alone or in combination with one or more of the first through fourth aspects, the indication of the selected beamforming configuration to use for the one or more communications comprises an indication of a number of reference signals for the UE to receive, an indication of one or more types of reference signals for the UE to receive, a beam search scheme for the UE to use, or a beam refinement scheme for the UE to use.

In a sixth aspect, alone or in combination with one or more of the first through fifth aspects, the indication of the capability to use the set of beamforming configurations is based at least in part on one or more of a flexibility to beamform based at least in part on applying a set of beam weights to a set of antenna elements, a capability to combine a first antenna element of a first tile of antenna elements with a second antenna element of a second tile of antenna elements, a set of supported beam weights associated with the first antenna element and the second antenna elements, or a set of supported phase jumps between the first antenna element of a first tile of antenna elements and the second antenna element of the second tile of antenna elements.

In a seventh aspect, alone or in combination with one or more of the first through sixth aspects, process 800 includes transmitting, for selection of the beamforming configuration to use for the one or more communications, an indication of one or more of a flexibility to beamform based at least in part on applying a set of beam weights to a set of antenna elements, a capability to combine a first antenna element of a first tile of antenna elements with a second antenna element of a second tile of antenna elements, a set of supported beam weights associated with the first antenna element and the second antenna elements, or a set of supported phase jumps between the first antenna element of the first tile of antenna elements and the second antenna element of the second tile of antenna elements.

In an eighth aspect, alone or in combination with one or more of the first through seventh aspects, the set of beamforming configurations associated with the beamforming circuit architecture of the UE are associated with an acquisition of a communication link for the UE via a first subset of antenna elements at the UE, or a mission-mode operation of the UE via a second subset of antenna elements at the UE.

In a ninth aspect, alone or in combination with one or more of the first through eighth aspects, process 800 includes receiving an indication of a configuration for transmitting the indication of the capability to use the set of beamforming configurations.

In a tenth aspect, alone or in combination with one or more of the first through ninth aspects, process 800 includes receiving an indication of a set of candidate beamforming configurations to include in the indication of the capability to use the set of beamforming configurations associated with the beamforming circuit architecture of the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:

FIG. 9 is a diagram illustrating an example process 900 performed, for example, by a base station, in accordance with the present disclosure. Example process 900 is an example where the base station (e.g., base station 110) performs operations associated with beamforming configurations.

As shown in FIG. 9, in some aspects, process 900 may include receiving, from a UE an indication of a capability to use a set of beamforming configurations associated with a beamforming circuit architecture of the UE (block 910). For example, the base station (e.g., using communication manager 150 and/or reception component 1102, depicted in FIG. 11) may receive, from a UE an indication of a capability to use a set of beamforming configurations associated with a beamforming circuit architecture of the UE, as described above.

As further shown in FIG. 9, in some aspects, process 900 may include transmitting an indication of a selected beamforming configuration to use for one or more communications (block 920). For example, the base station (e.g., using communication manager 150 and/or transmission component 1104, depicted in FIG. 11) may transmit an indication of a selected beamforming configuration to use for one or more communications, as described above.

Process 900 may include additional aspects, such as any single aspect or any combination of aspects described below and/or in connection with one or more other processes described elsewhere herein.

In a first aspect, the indication of the capability to use the set of beamforming configurations comprises one or more of an indication of a capability to apply a set of beam weights to a set of antenna elements, or an indication of a granularity of the beam properties identifiable with the set of beam weights that the UE can apply to the set of antenna elements.

In a second aspect, alone or in combination with the first aspect, the beamforming circuit architecture of the UE comprises one or more of one or more Butler matrices tiled together, one or more vector sum modulator architectures tiled together, or one or more lens array architectures tiled together.

In a third aspect, alone or in combination with one or more of the first and second aspects, the beamforming circuit architecture of the UE is associated with one or more of antenna group sizes supported by the UE, carrier frequencies supported by the UE, flexibility in beamforming capabilities, space or aperture allocated for antenna elements of the UE, power resource constraints of the UE, or thermal constraints of the UE.

In a fourth aspect, alone or in combination with one or more of the first through third aspects, the beam properties identifiable with the set of beam weights comprise one or more of a range of beamwidths and associated array gains supported by the UE, or a set of beamwidths and associated array gains supported by the UE.

In a fifth aspect, alone or in combination with one or more of the first through fourth aspects, the indication of the selected beamforming configuration to use for the one or more communications comprises an indication of a number of reference signals for the UE to receive, an indication of one or more types of reference signals for the UE to receive, a beam search scheme for the UE to use, or a beam refinement scheme for the UE to use.

In a sixth aspect, alone or in combination with one or more of the first through fifth aspects, the indication of the capability to use the set of beamforming configurations is based at least in part on one or more of a flexibility to beamform based at least in part on applying a set of beam weights to a set of antenna elements, a capability to combine a first antenna element of a first tile of antenna elements with a second antenna element of a second tile of antenna elements, a set of supported beam weights associated with the first antenna element and the second antenna elements, or a set of supported phase jumps between the first antenna element of a first tile of antenna elements and the second antenna element of the second tile of antenna elements.

In a seventh aspect, alone or in combination with one or more of the first through sixth aspects, process 900 includes receiving, for selection of the beamforming configuration to use for the one or more communications, an indication of one or more of a flexibility to beamform based at least in part on applying a set of beam weights to a set of antenna elements, a capability to combine a first antenna element of a first tile of antenna elements with a second antenna element of a second tile of antenna elements, a set of supported beam weights associated with the first antenna element and the second antenna elements, or a set of supported phase jumps between the first antenna element of the first tile of antenna elements and the second antenna element of the second tile of antenna elements.

In an eighth aspect, alone or in combination with one or more of the first through seventh aspects, the set of beamforming configurations associated with the beamforming circuit architecture of the UE are associated with an acquisition of a communication link for the UE via a first subset of antenna elements at the UE, or a mission-mode operation of the UE via a second subset of antenna elements at the UE.

In a ninth aspect, alone or in combination with one or more of the first through eighth aspects, process 900 includes transmitting an indication of a configuration for transmitting the indication of the capability to use the set of beamforming configurations.

In a tenth aspect, alone or in combination with one or more of the first through ninth aspects, process 900 includes transmitting an indication of a set of candidate beamforming configurations to include in the indication of the capability to use the set of beamforming configurations associated with the beamforming circuit architecture of the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
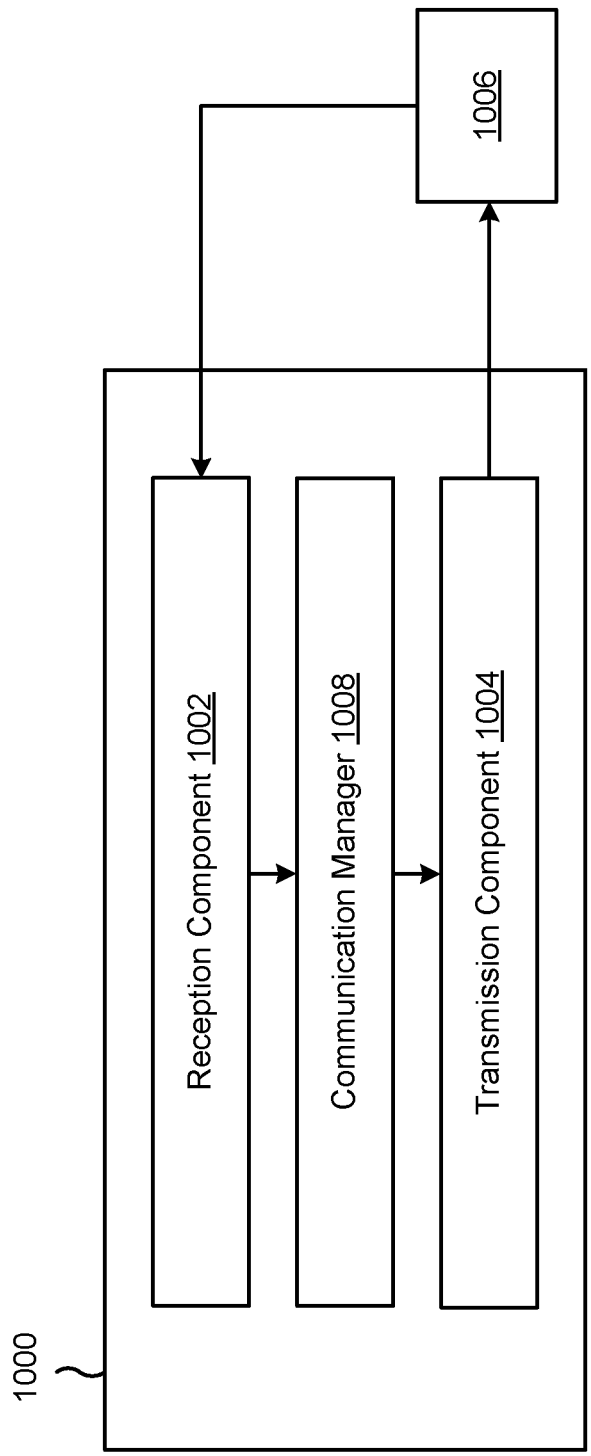
FIGS. 10 and 11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 140).

In some aspects, the apparatus 1000 may be configured to perform one or more operations described herein in connection with FIGS. 4-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The transmission component 1004 may transmit an indication of a capability to use a set of beamforming configurations associated with a beamforming circuit architecture of the UE. The reception component 1002 may receive an indication of a selected beamforming configuration to use for one or more communications.

The transmission component 1004 may transmit, for selection of the beamforming configuration to use for the one or more communications, an indication of one or more of a flexibility to beamform based at least in part on applying a set of beam weights to a set of antenna elements, a capability to combine a first antenna element of a first tile of antenna elements with a second antenna element of a second tile of antenna elements, a set of supported beam weights associated with the first antenna element and the second antenna elements, or a set of supported phase jumps between the first antenna element of the first tile of antenna elements and the second antenna element of the second tile of antenna elements.

The reception component 1002 may receive an indication of a configuration for transmitting the indication of the capability to use the set of beamforming configurations.

The reception component 1002 may receive an indication of a set of candidate beamforming configurations to include in the indication of the capability to use the set of beamforming configurations associated with the beamforming circuit architecture of the UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
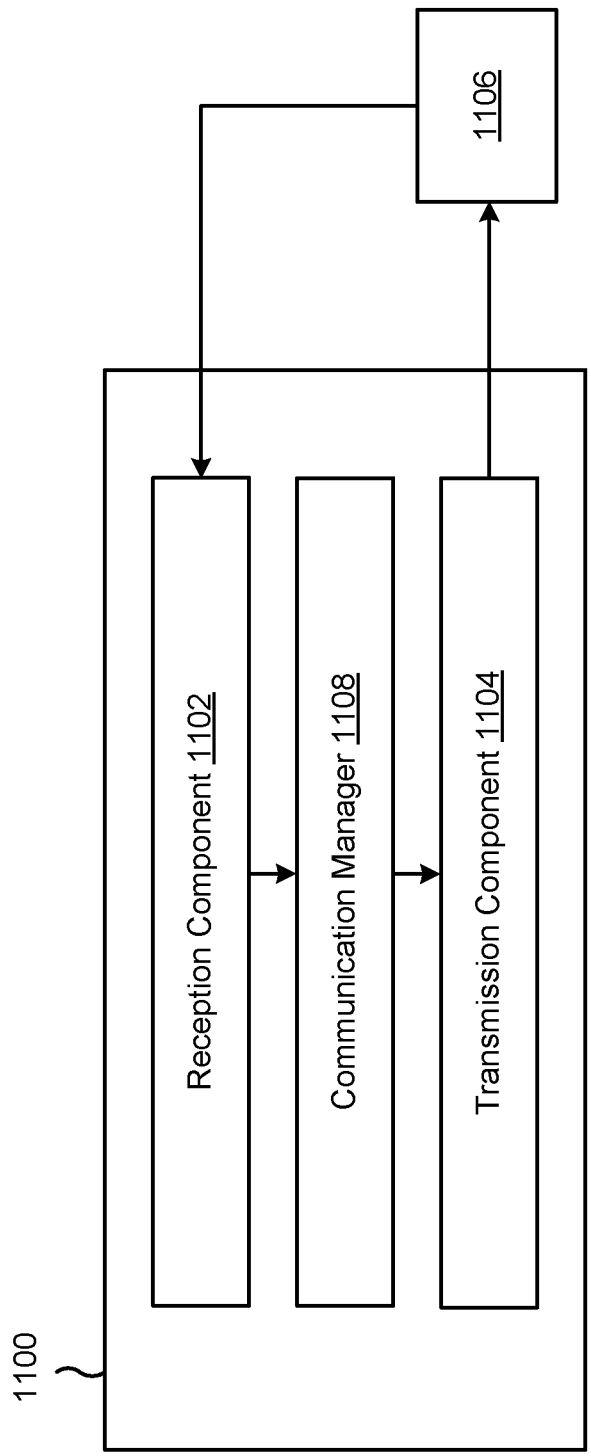

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108 (e.g., the communication manager 150).

In some aspects, the apparatus 1100 may be configured to perform one or more operations described herein in connection with FIGS. 4-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The reception component 1102 may receive, from a UE an indication of a capability to use a set of beamforming configurations associated with a beamforming circuit architecture of the UE. The transmission component 1104 may transmit an indication of a selected beamforming configuration to use for one or more communications.

The reception component 1102 may receive, for selection of the beamforming configuration to use for the one or more communications, an indication of one or more of a flexibility to beamform based at least in part on applying a set of beam weights to a set of antenna elements, a capability to combine a first antenna element of a first tile of antenna elements with a second antenna element of a second tile of antenna elements, a set of supported beam weights associated with the first antenna element and the second antenna elements, or a set of supported phase jumps between the first antenna element of the first tile of antenna elements and the second antenna element of the second tile of antenna elements.

The transmission component 1104 may transmit an indication of a configuration for transmitting the indication of the capability to use the set of beamforming configurations.

The transmission component 1104 may transmit an indication of a set of candidate beamforming configurations to include in the indication of the capability to use the set of beamforming configurations associated with the beamforming circuit architecture of the UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: transmitting an indication of a capability to use a set of beamforming configurations associated with a beamforming circuit architecture of the UE; and receiving an indication of a selected beamforming configuration to use for one or more communications.

Aspect 2: The method of Aspect 1, wherein the indication of the capability to use the set of beamforming configurations comprises one or more of: an indication of a capability to apply a set of beam weights to a set of antenna elements, or an indication of a granularity of beam properties identifiable with the set of beam weights that the UE can apply to the set of antenna elements.

Aspect 3: The method of Aspect 2, wherein the beam properties identifiable with the set of beam weights comprise one or more of: a range of beamwidths and associated array gains supported by the UE, or a set of beamwidths and associated array gains supported by the UE.

Aspect 4: The method of any of Aspects 1-3, wherein the beamforming circuit architecture of the UE comprises one or more of: one or more Butler matrices tiled together, one or more vector sum modulator architectures tiled together, or one or more lens array architectures tiled together.

Aspect 5: The method of any of Aspects 1-4, wherein the beamforming circuit architecture of the UE is associated with one or more of: antenna group sizes supported by the UE, carrier frequencies supported by the UE, flexibility in beamforming capabilities, space or aperture allocated for antenna elements of the UE, power resource constraints of the UE, or thermal constraints of the UE.

Aspect 6: The method of any of Aspects 1-5, wherein the indication of the selected beamforming configuration to use for the one or more communications comprises: an indication of a number of reference signals for the UE to receive, an indication of one or more types of reference signals for the UE to receive, a beam search scheme for the UE to use, or a beam refinement scheme for the UE to use.

Aspect 7: The method of any of Aspects 1-6, wherein the indication of the capability to use the set of beamforming configurations is based at least in part on one or more of: a flexibility to beamform based at least in part on applying a set of beam weights to a set of antenna elements, a capability to combine a first antenna element of a first tile of antenna elements with a second antenna element of a second tile of antenna elements, a set of supported beam weights associated with the first antenna element and the second antenna elements, or a set of supported phase jumps between the first antenna element of a first tile of antenna elements and the second antenna element of the second tile of antenna elements.

Aspect 8: The method of any of Aspects 1-7, further comprising transmitting, for selection of the beamforming configuration to use for the one or more communications, an indication of one or more of: a flexibility to beamform based at least in part on applying a set of beam weights to a set of antenna elements, a capability to combine a first antenna element of a first tile of antenna elements with a second antenna element of a second tile of antenna elements, a set of supported beam weights associated with the first antenna element and the second antenna elements, or a set of supported phase jumps between the first antenna element of the first tile of antenna elements and the second antenna element of the second tile of antenna elements.

Aspect 9: The method of any of Aspects 1-8, wherein the set of beamforming configurations associated with the beamforming circuit architecture of the UE are associated with: an acquisition of a communication link for the UE via a first subset of antenna elements at the UE, or a mission-mode operation of the UE via a second subset of antenna elements at the UE.

Aspect 10: The method of any of Aspects 1-9, further comprising: receiving an indication of a configuration for transmitting the indication of the capability to use the set of beamforming configurations.

Aspect 11: The method of any of Aspects 1-10, further comprising: receiving an indication of a set of candidate beamforming configurations to include in the indication of the capability to use the set of beamforming configurations associated with the beamforming circuit architecture of the UE.

Aspect 12: A method of wireless communication performed by a base station, comprising: receiving, from a user equipment (UE) an indication of a capability to use a set of beamforming configurations associated with a beamforming circuit architecture of the UE; and transmitting an indication of a selected beamforming configuration to use for one or more communications.

Aspect 13: The method of Aspect 12, wherein the indication of the capability to use the set of beamforming configurations comprises one or more of: an indication of a capability to apply a set of beam weights to a set of antenna elements, or an indication of a granularity of the beam properties identifiable with the set of beam weights that the UE can apply to the set of antenna elements.

Aspect 14: The method of any of Aspects 12 or 13, wherein the beamforming circuit architecture of the UE comprises one or more of: one or more Butler matrices tiled together, one or more vector sum modulator architectures tiled together, or one or more lens array architectures tiled together.

Aspect 15: The method of any of Aspects 12-14, wherein the beamforming circuit architecture of the UE is associated with one or more of: antenna group sizes supported by the UE, carrier frequencies supported by the UE, flexibility in beamforming capabilities, space or aperture allocated for antenna elements of the UE, power resource constraints of the UE, or thermal constraints of the UE.

Aspect 16: The method of any of Aspects 12-15, wherein the beam properties identifiable with the set of beam weights comprise one or more of: a range of beamwidths and associated array gains supported by the UE, or a set of beamwidths and associated array gains supported by the UE.

Aspect 17: The method of any of Aspects 12-16, wherein the indication of the selected beamforming configuration to use for the one or more communications comprises: an indication of a number of reference signals for the UE to receive, an indication of one or more types of reference signals for the UE to receive, a beam search scheme for the UE to use, or a beam refinement scheme for the UE to use.

Aspect 18: The method of any of Aspects 12-17, wherein the indication of the capability to use the set of beamforming configurations is based at least in part on one or more of: a flexibility to beamform based at least in part on applying a set of beam weights to a set of antenna elements, a capability to combine a first antenna element of a first tile of antenna elements with a second antenna element of a second tile of antenna elements, a set of supported beam weights associated with the first antenna element and the second antenna elements, or a set of supported phase jumps between the first antenna element of a first tile of antenna elements and the second antenna element of the second tile of antenna elements.

Aspect 19: The method of any of Aspects 12-18, further comprising receiving, for selection of the beamforming configuration to use for the one or more communications, an indication of one or more of: a flexibility to beamform based at least in part on applying a set of beam weights to a set of antenna elements, a capability to combine a first antenna element of a first tile of antenna elements with a second antenna element of a second tile of antenna elements, a set of supported beam weights associated with the first antenna element and the second antenna elements, or a set of supported phase jumps between the first antenna element of the first tile of antenna elements and the second antenna element of the second tile of antenna elements.

Aspect 20: The method of any of Aspects 12-19, wherein the set of beamforming configurations associated with the beamforming circuit architecture of the UE are associated with: an acquisition of a communication link for the UE via a first subset of antenna elements at the UE, or a mission-mode operation of the UE via a second subset of antenna elements at the UE.

Aspect 21: The method of any of Aspects 12-20, further comprising: transmitting an indication of a configuration for transmitting the indication of the capability to use the set of beamforming configurations.

Aspect 22: The method of any of Aspects 12-21, further comprising: transmitting an indication of a set of candidate beamforming configurations to include in the indication of the capability to use the set of beamforming configurations associated with the beamforming circuit architecture of the UE.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive an indication of a set of information that the UE is to include in an indication of a capability to use a set of beamforming configurations,
         wherein the set of beamforming configurations is associated with a beamforming circuit architecture of the UE that includes one or more tiles of antenna elements;
      transmit, based at least in part on the set of information, the indication of the capability,
         wherein the indication of the capability is indicative of one or more beamforming configurations supported by the UE depending on a size used for tiling the antenna elements; and
      receive an indication of a selected beamforming configuration to use for one or more communications based at least in part on the indication of the capability.

2. The UE of claim 1, wherein the indication of the capability to use the set of beamforming configurations comprises one or more of:
   an indication of a capability to apply a set of beam weights to a set of antenna elements, or
   an indication of a granularity of beam properties identifiable with the set of beam weights that the UE is configured to apply to the set of antenna elements.

3. The UE of claim 2, wherein the beam properties identifiable with the set of beam weights comprise one or more of:
   a range of beamwidths and associated array gains supported by the UE, or
   a set of beamwidths and associated array gains supported by the UE.

4. The UE of claim 1, wherein the beamforming circuit architecture of the UE comprises one or more of:
   one or more Butler matrices tiled together,
   one or more vector sum modulator architectures tiled together, or
   one or more lens array architectures tiled together.

5. The UE of claim 1, wherein the beamforming circuit architecture of the UE is associated with one or more of:
   antenna group sizes supported by the UE,
   carrier frequencies supported by the UE,
   flexibility in beamforming capabilities,
   space or aperture allocated for antenna elements of the UE,
   power resource constraints of the UE, or
   thermal constraints of the UE.

6. The UE of claim 1, wherein the indication of the selected beamforming configuration to use for the one or more communications comprises:
   an indication of a number of reference signals for the UE to receive,
   an indication of one or more types of reference signals for the UE to receive,
   a beam search scheme for the UE to use, or
   a beam refinement scheme for the UE to use.

7. The UE of claim 1, wherein the indication of the capability to use the set of beamforming configurations is based at least in part on one or more of:
   a flexibility to beamform based at least in part on applying a set of beam weights to a set of antenna elements,
   a capability to combine a first antenna element of a first tile of antenna elements with a second antenna element of a second tile of antenna elements,
   a set of supported beam weights associated with the first antenna element and the second antenna element, or a set of supported phase jumps between the first antenna element of a first tile of antenna elements and the second antenna element of the second tile of antenna elements.

8. The UE of claim 1, wherein the one or more processors are further configured to transmit, for selection of the beamforming configuration to use for the one or more communications, an indication of one or more of:
a flexibility to beamform based at least in part on applying a set of beam weights to a set of antenna elements,
a capability to combine a first antenna element of a first tile of antenna elements with a second antenna element of a second tile of antenna elements,
a set of supported beam weights associated with the first antenna element and the second antenna element, or
a set of supported phase jumps between the first antenna element of the first tile of antenna elements and the second antenna element of the second tile of antenna elements.

9. The UE of claim 1, wherein the set of beamforming configurations associated with the beamforming circuit architecture of the UE are associated with:
an acquisition of a communication link for the UE via a first subset of antenna elements at the UE, or
a mission-mode operation of the UE via a second subset of antenna elements at the UE.

10. The UE of claim 1, wherein the one or more processors are further configured to:
receive an indication of a set of candidate beamforming configurations to include in the indication of the capability to use the set of beamforming configurations associated with the beamforming circuit architecture of the UE.

11. A network entity for wireless communication, comprising:
one or more memories; and
one or more processors, coupled to the one or more memories, configured to:
transmit an indication of a set of information that a user equipment (UE) is to include in an indication of a capability to use a set of beamforming configurations,
wherein the set of beamforming configurations is associated with a beamforming circuit architecture of the UE that includes one or more tiles of antenna elements;
receive, based at least in part on the set of information, the indication of the capability,
wherein the indication of the capability is indicative of one or more beamforming configurations supported by the UE depending on a size used for tiling the antenna elements; and
transmit an indication of a selected beamforming configuration to use for one or more communications based at least in part on the indication of the capability.

12. The network entity of claim 11, wherein the indication of the capability to use the set of beamforming configurations comprises one or more of:
an indication of a capability to apply a set of beam weights to a set of antenna elements, or
an indication of a granularity of beam properties identifiable with the set of beam weights that the UE is configured to apply to the set of antenna elements.

13. The network entity of claim 12, wherein the beam properties identifiable with the set of beam weights comprise one or more of:
a range of beamwidths and associated array gains supported by the UE, or
a set of beamwidths and associated array gains supported by the UE.

14. The network entity of claim 11, wherein the beamforming circuit architecture of the UE comprises one or more of:
one or more Butler matrices tiled together,
one or more vector sum modulator architectures tiled together, or
one or more lens array architectures tiled together.

15. The network entity of claim 11, wherein the beamforming circuit architecture of the UE is associated with one or more of:
antenna group sizes supported by the UE,
carrier frequencies supported by the UE,
flexibility in beamforming capabilities,
space or aperture allocated for antenna elements of the UE,
power resource constraints of the UE, or
thermal constraints of the UE.

16. The network entity of claim 11, wherein the indication of the selected beamforming configuration to use for the one or more communications comprises:
an indication of a number of reference signals for the UE to receive,
an indication of one or more types of reference signals for the UE to receive,
a beam search scheme for the UE to use, or
a beam refinement scheme for the UE to use.

17. The network entity of claim 11, wherein the indication of the capability to use the set of beamforming configurations is based at least in part on one or more of:
a flexibility to beamform based at least in part on applying a set of beam weights to a set of antenna elements,
a capability to combine a first antenna element of a first tile of antenna elements with a second antenna element of a second tile of antenna elements,
a set of supported beam weights associated with the first antenna element and the second antenna element, or
a set of supported phase jumps between the first antenna element of the first tile of antenna elements and the second antenna element of the second tile of antenna elements.

18. The network entity of claim 11, wherein the one or more processors are further configured to receive, for selection of the beamforming configuration to use for the one or more communications, an indication of one or more of:
a flexibility to beamform based at least in part on applying a set of beam weights to a set of antenna elements,
a capability to combine a first antenna element of a first tile of antenna elements with a second antenna element of a second tile of antenna elements,
a set of supported beam weights associated with the first antenna element and the second antenna element, or
a set of supported phase jumps between the first antenna element of the first tile of antenna elements and the second antenna element of the second tile of antenna elements.

19. The network entity of claim 11, wherein the set of beamforming configurations associated with the beamforming circuit architecture of the UE are associated with:
an acquisition of a communication link for the UE via a first subset of antenna elements at the UE, or a mission-mode operation of the UE via a second subset of antenna elements at the UE.

20. The network entity of claim 11, wherein the one or more processors are further configured to:
transmit an indication of a set of candidate beamforming configurations to include in the indication of the capability to use the set of beamforming configurations associated with the beamforming circuit architecture of the UE.

21. A method of wireless communication performed by a user equipment (UE), comprising:
receiving an indication of a set of information that the UE is to include in an indication of a capability to use a set of beamforming configurations,
wherein the set of beamforming configurations is associated with a beamforming circuit architecture of the UE that includes one or more tiles of antenna elements;
transmitting, based at least in part on the set of information, the indication of the capability,
wherein the indication of the capability is indicative of one or more beamforming configurations supported by the UE depending on a size used for tiling the antenna elements; and
receiving an indication of a selected beamforming configuration to use for one or more communications based at least in part on the indication of the capability.

22. The method of claim 21, wherein the beamforming circuit architecture of the UE comprises one or more of:
one or more Butler matrices tiled together, or
one or more vector sum modulator architectures tiled together.

23. The method of claim 21, wherein the indication of the capability to use the set of beamforming configurations is based at least in part on one or more of:
a flexibility to beamform based at least in part on applying a set of beam weights to a set of antenna elements,
a capability to combine a first antenna element of a first tile of antenna elements with a second antenna element of a second tile of antenna elements,
a set of supported beam weights associated with the first antenna element and the second antenna element, or
a set of supported phase jumps between the first antenna element of a first tile of antenna elements and the second antenna element of the second tile of antenna elements.

24. The method of claim 21, further comprising transmitting, for selection of the beamforming configuration to use for the one or more communications, an indication of one or more of:
a flexibility to beamform based at least in part on applying a set of beam weights to a set of antenna elements,
a capability to combine a first antenna element of a first tile of antenna elements with a second antenna element of a second tile of antenna elements,
a set of supported beam weights associated with the first antenna element and the second antenna element, or a set of supported phase jumps between the first antenna element of the first tile of antenna elements and the second antenna element of the second tile of antenna elements.

25. A method of wireless communication performed by a network entity, comprising:
transmitting an indication of a set of information that a user equipment (UE) is to include in an indication of a capability to use a set of beamforming configurations,
wherein the set of beamforming configurations is associated with a beamforming circuit architecture of the UE that includes one or more tiles of antenna elements;
receiving, based at least in part on the set of information, the indication of the capability,
wherein the indication of the capability is indicative of one or more beamforming configurations supported by the UE depending on a size used for tiling the antenna elements; and
transmitting an indication of a selected beamforming configuration to use for one or more communications based at least in part on the indication of the capability.

26. The method of claim 25, wherein the beamforming circuit architecture of the UE comprises one or more of:
one or more Butler matrices tiled together,
one or more vector sum modulator architectures tiled together, or
one or more lens array architectures tiled together.

27. The method of claim 25, wherein the indication of the capability to use the set of beamforming configurations is based at least in part on one or more of:
a flexibility to beamform based at least in part on applying a set of beam weights to a set of antenna elements,
a capability to combine a first antenna element of a first tile of antenna elements with a second antenna element of a second tile of antenna elements,
a set of supported beam weights associated with the first antenna element and the second antenna element, or
a set of supported phase jumps between the first antenna element of a first tile of antenna elements and the second antenna element of the second tile of antenna elements.

28. The method of claim 25, further comprising receiving, for selection of the beamforming configuration to use for the one or more communications, an indication of one or more of:
a flexibility to beamform based at least in part on applying a set of beam weights to a set of antenna elements,
a capability to combine a first antenna element of a first tile of antenna elements with a second antenna element of a second tile of antenna elements,
a set of supported beam weights associated with the first antenna element and the second antenna element, or
a set of supported phase jumps between the first antenna element of the first tile of antenna elements and the second antenna element of the second tile of antenna elements.

* * * * *